(12) United States Patent
Aritomi

(10) Patent No.: US 6,344,908 B1
(45) Date of Patent: *Feb. 5, 2002

(54) IMAGE PROCESSING SYSTEM FOR PROCESSING ACHROMATIC COLOR IMAGE DATA

(75) Inventor: Masanori Aritomi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,500

(22) Filed: Mar. 28, 1997

(30) Foreign Application Priority Data

Apr. 2, 1996 (JP) .............................. 8-080011

(51) Int. Cl.⁷ ................................. G03F 3/08
(52) U.S. Cl. ...................... 358/529; 358/538
(58) Field of Search ................ 358/529, 530, 358/540, 515, 538; 382/162, 163

(56) References Cited

U.S. PATENT DOCUMENTS

| | | | | |
|---|---|---|---|---|
| 5,220,417 A | * | 6/1993 | Sugiura | 358/468 |
| 5,287,204 A | * | 2/1994 | Koizumi et al. | 358/538 |
| 5,321,531 A | * | 6/1994 | Hasebe et al. | 358/505 |
| 5,357,354 A | * | 10/1994 | Matsunawa et al. | 358/530 |
| 5,457,549 A | | 10/1995 | Kumada et al. | 358/530 |
| 5,788,906 A | * | 7/1998 | Shishizuka | 358/500 |
| 5,949,427 A | * | 9/1999 | Nishikawa et al. | 345/431 |
| 5,973,804 A | * | 10/1999 | Yamada | 358/538 |

* cited by examiner

*Primary Examiner*—Andrew W. Johns
(74) *Attorney, Agent, or Firm*—Fitzpatrick, Cella, Harper & Scinto

(57) ABSTRACT

An image processing system for executing a color process on color image data and generating output color image data composed of a plurality of color component data including black component data, the system using a mode for generating the output color image data such that, when input color image data is an achromatic color, color component data other than black component data in the output color image data are substantially zero-valued. The system includes setting, based on an instruction from a user, relationships between a plurality of types of object images and the mode, inputting object image data of an input image, discriminating the type of the object image data, and executing the color process on color image data of the object image data using the mode based on the setting step and the type discriminated in the discriminating step.

8 Claims, 14 Drawing Sheets

| FIG. 5A |
| FIG. 5B |
| FIG. 5C |

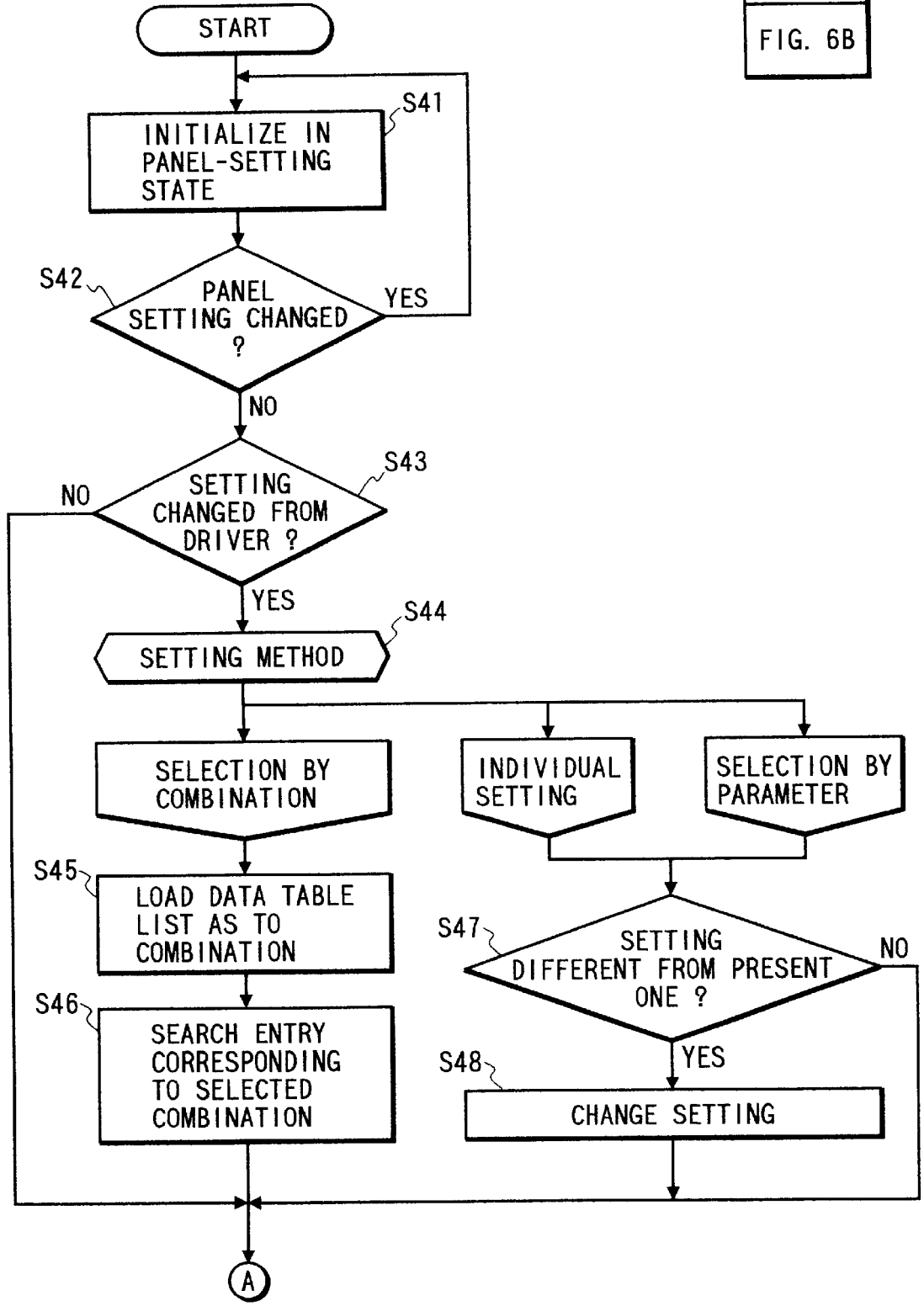

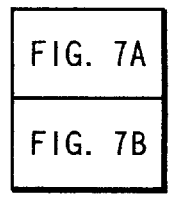
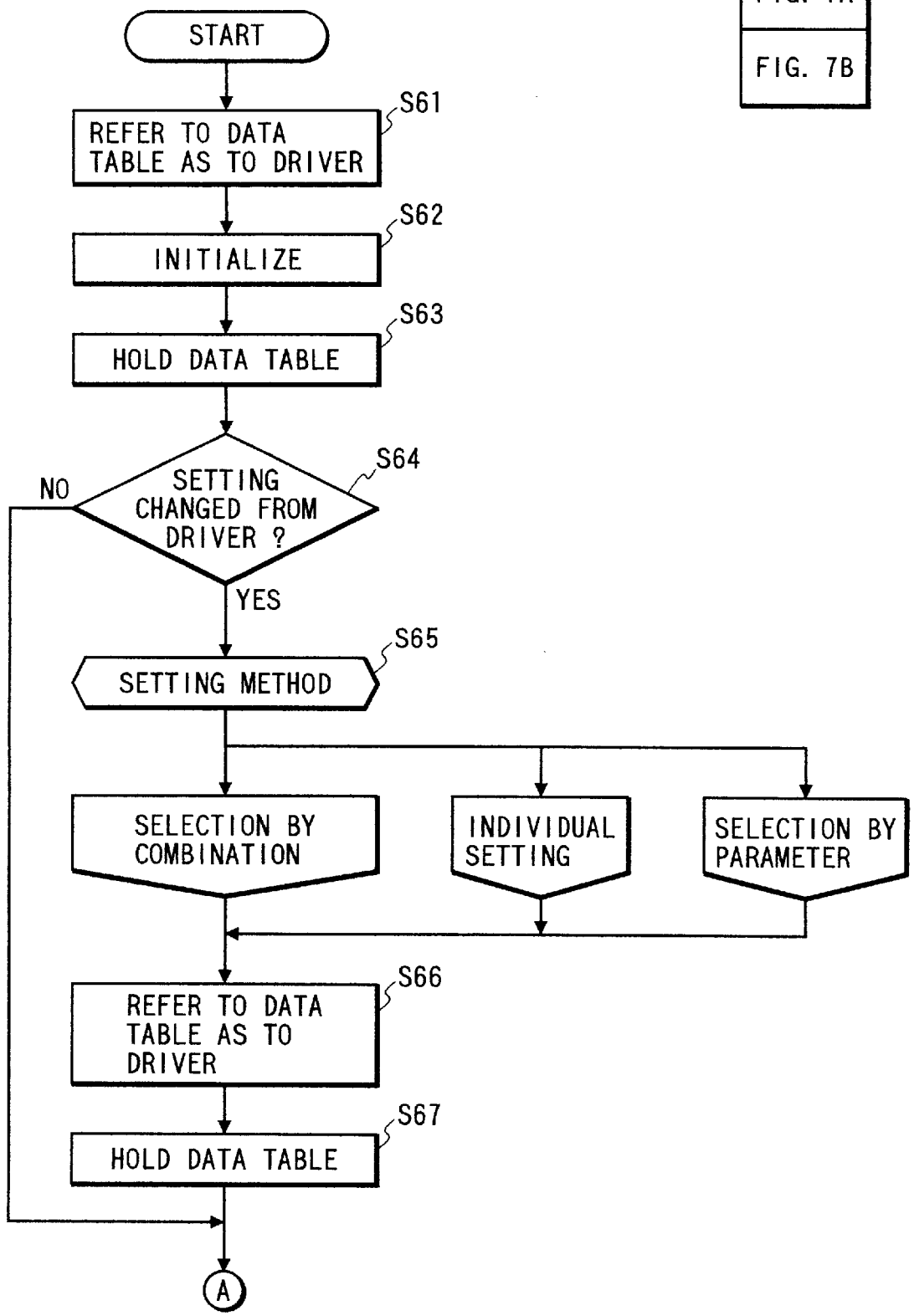

IMAGE PROCESSING SYSTEM FOR PROCESSING ACHROMATIC COLOR IMAGE DATA

BACKGROUND OF THE INVENTION

1. Field of the Invention

The invention relates to image processing apparatus and method.

2. Related Background Art

In recent years, as an image output system, there has been known an image output system comprising a host computer and a printer connected thereto through an interface (for example, Centronics interface or the like), wherein output information that is inputted from the host is analyzed on the printer side, bit map data is developed as output data of a printer engine, for instance, a laser beam printer, a laser beam modulated on the basis of the developed data is scanned and exposed to a photosensitive drum, and an image is recorded.

When the printer has an emulation function, the system is configured so that a plurality of printer control language systems can be processed, and a printing process can be executed while switching an emulation mode and a native mode in accordance with an application which is executed by the user. A switch to switch the control languages of the printer and a card slot to instruct the switching are previously provided for the printer.

Hitherto, a color process in the printer having such a function has been fixed. Therefore, the fixed color process is performed to objects having different contents.

Although there is also a printer having a plurality of color processes, the color processes can be switched and used only on a job unit basis. Therefore, one kind of color process which was set for an image in which a plurality of different objects exist is executed.

In addition, a gray cannot be guaranteed in an output color for an input gray color signal included in an input image without switching the color processes.

The above conventional image output system has the following problems.

Since the color process has been fixed, adaptation or inadaptation occurs in dependence on the object.

Since a gray processing method for an input gray in such single means cannot be designated, a color deviation occurs in a portion where the user expects an output in gray.

SUMMARY OF THE INVENTION

The invention is made to solve the above problems and it is an object of the first invention to realize reconstruction of an achromatic color in a formed image according to a demand of the user.

To accomplish the above object, according to the invention, there is provided an image processing method having a mode for performing a color process so that an image is formed in almost black monochromatic color when an input color is an achromatic color, comprising the steps of: forming mode setting information indicating whether the mode is applied or not on the basis of a manual instruction for each of a plurality of different kinds of objects; inputting object information indicative of the object constructing an input image; discriminating the kind of object on the basis of the object information; and performing the color process to the object information on the basis of the mode setting information and the kind of object.

It is an object of the second invention to enable a gray compensation to be performed on the basis of the kind of object and to enable an output image of a high quality to be obtained.

To accomplish the above object, according to the invention, there is provided an image processing method comprising the steps of: setting a gray compensating process every kind of object; performing a first color process corresponding to the kind of object of input image data on the basis of the setting; performing a second color process corresponding to the kind of object of the image data subjected to the first color process on the basis of the setting; and performing the gray compensation by controlling the first and second color processes on the basis of the setting in an interlocking manner.

The above and other objects and features of the present invention will become apparent from the following detailed description and the appended claims with reference to the accompanying drawings.

DETAILED DESCRIPTION OF THE PREFERRED EMBODIMENT

A preferred embodiment of the invention will now be described in detail hereinbelow with reference to the drawings. Prior to explaining a construction of the embodiment, a structure of a laser beam printer suitable for applying the embodiment will be first described with reference to FIG. 1. The printer to which the embodiment is applied is not limited to the laser beam printer or an ink jet printer, which will be explained hereinlater, but can be also obviously applied to a printer of another printing system.

Figure 1:
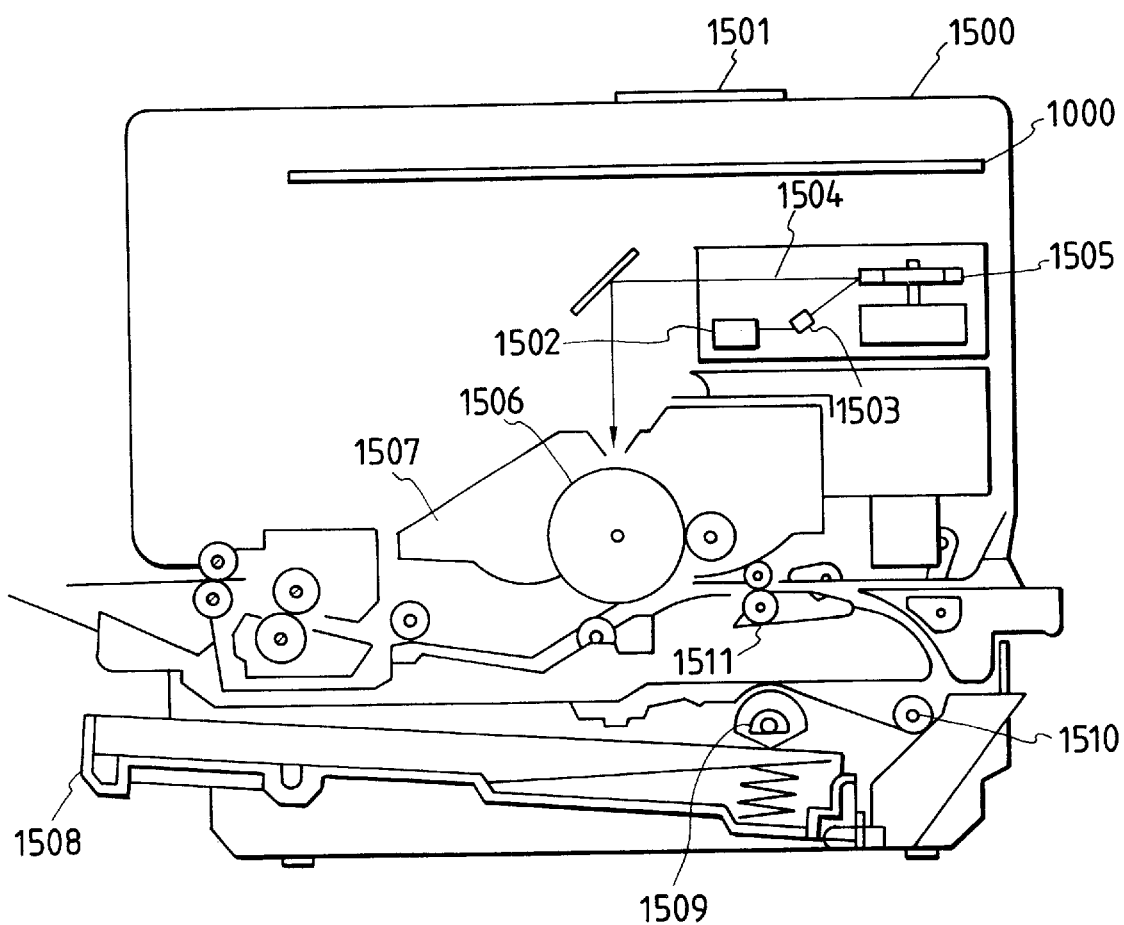
FIG. 1 is a cross sectional view showing a structure of a laser beam printer showing an example of an output apparatus according to an embodiment.

FIG. 1 is a cross sectional view showing a structure of the laser beam printer (LBP) as an example of the printer.

In the diagram, reference numeral 1500 denotes an LBP main body for inputting and storing print information (image information or the like), form information, macro command, or the like which is supplied from a host computer connected to the LBP and forming an image onto a recording paper or the like as a recording medium in accordance with those information. Reference numeral 1501 denotes a console unit on which switches which are operated by the operator, an LED display, and the like are arranged. Reference numeral 1000 denotes a printer control unit for controlling the whole LBP main body 1500 and analyzing the image information or the like that is supplied from the host computer. A laser driver 1502 is a circuit to drive a semiconductor laser 1503. The laser driver 1502 controls the semiconductor laser 1503 in accordance with a video signal showing an output image which was inputted and controls the on/off switching operations of a laser beam 1504. The laser beam 1504 is swung to the right and left by a rotational polygon mirror 1505 and scans and exposes on an electrostatic drum 1506. Thus, an electrostatic latent image indicative of an output image is formed on the electrostatic drum 1506. The latent image is developed by a developing unit 1507 arranged around the electrostatic drum 1506 and, after that, it is transferred onto a recording paper. The recording papers are enclosed in a paper cassette 1508 set in the LBP 1500 and are fed one by one into the system by a paper feeding roller 1509 and conveying rollers 1510 and 1511. The output image is transferred onto the recording paper.

The LBP main body 1500 has at least one or more card slots (not shown) and in addition to built-in fonts, an option font card and a control card (emulation card) of a different language system can be connected.

Figure 2:
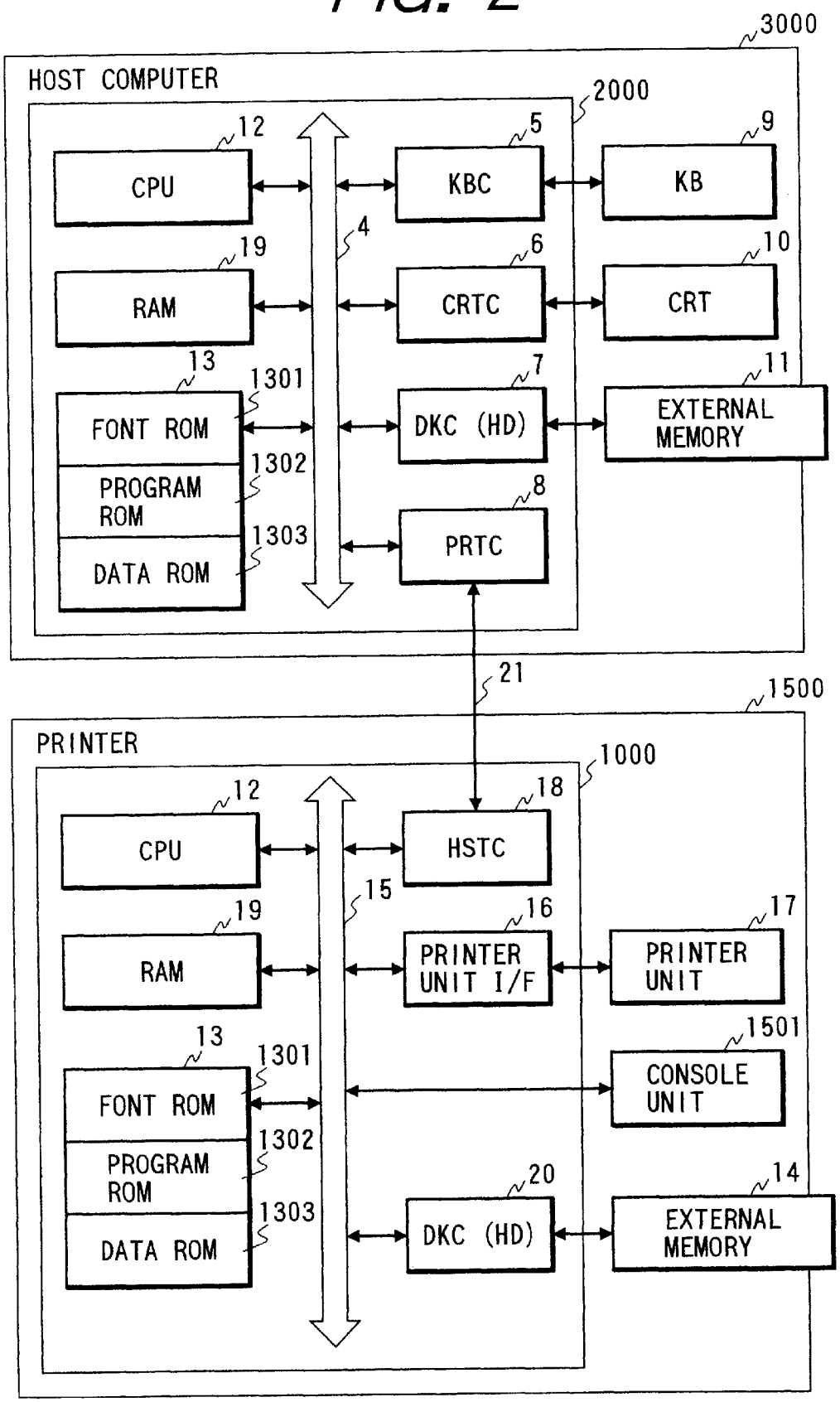
FIG. 2 is a block diagram showing a construction of a host computer in an image output system and a printer control unit of a printer according to the embodiment.

FIG. 2 is a block diagram showing a construction of an image output system including the printer 1500 and a host computer 3000 according to the embodiment. A construction of the printer control unit 1000 of the printer 1500 and the host computer 3000 is mainly shown.

The invention can be applied to a system constructed by single equipment, a system constructed by a plurality of equipment as in the embodiment, or a system in which processes are executed among a plurality of equipment connected through a network such as an LAN or the like so long as functions in the embodiment are executed.

In FIG. 2, the host computer 3000 has a CPU 12 for executing various processes on the basis of programs stored in a program ROM 1302 in an ROM 13. The CPU 12 integratedly controls each device that is connected to a system bus 4. Further, the CPU 12 opens various windows registered on the basis of a command which is instructed by a mouse cursor or the like (not shown) on a CRT 10 and executes processes such as a color process and the like on the basis of various set contents which were manually instructed on the windows by the user.

Programs for executing the color processes which are performed by the host computer as shown in flowcharts of FIGS. 5A, 5B, 5C, 7A and 7B have been stored in the program ROM 1302. Font data or the like to convert document data which was edited and formed into a character pattern displayed on the CRT 10 at the time of a document process has been stored in a font ROM 1301. Various data (for example, directory information, a printer driver table, and the like) which is used upon execution of the color processes or the like has been stored in a data ROM 1303.

Reference numeral 19 denotes an RAM which functions as a main memory, a work area, or the like of the CPU 12. A control program that is executed by the CPU 12 can be also stored in an external memory 11 such as floppy disk, CD-ROM, or the like.

Reference numeral 5 denotes a keyboard controller (KBC) for controlling a key input from a keyboard 9 or a pointing device (not shown); 6 a CRT controller (CRTC) for controlling a display of the CRT display (CRT) 10; 7 a disk controller (DKC) for controlling an access to the external memory 11 such as hard disk (HD), floppy disk (FD), CD-ROM, or the like to store a boot program, various applications, font data, user file, edition file, and the like; 8 a printer controller (PRTC) for controlling a communicating process with the printer 1500 connected through a predetermined bidirectional interface (interface) 21.

A construction of the printer control unit 1000 of the printer 1500 will now be described. Reference numeral 12 denotes the printer CPU for integratedly controlling accesses to various devices connected to a system bus 15 on the basis of the control program stored in the program ROM in the ROM 13, a control program which is down-loaded from an external memory 14 and is stored in an RAM 19, or the like and generating an image signal indicative of an output image to a printer unit (printer engine) 17 connected through a printer unit interface 16.

Figure 6B:
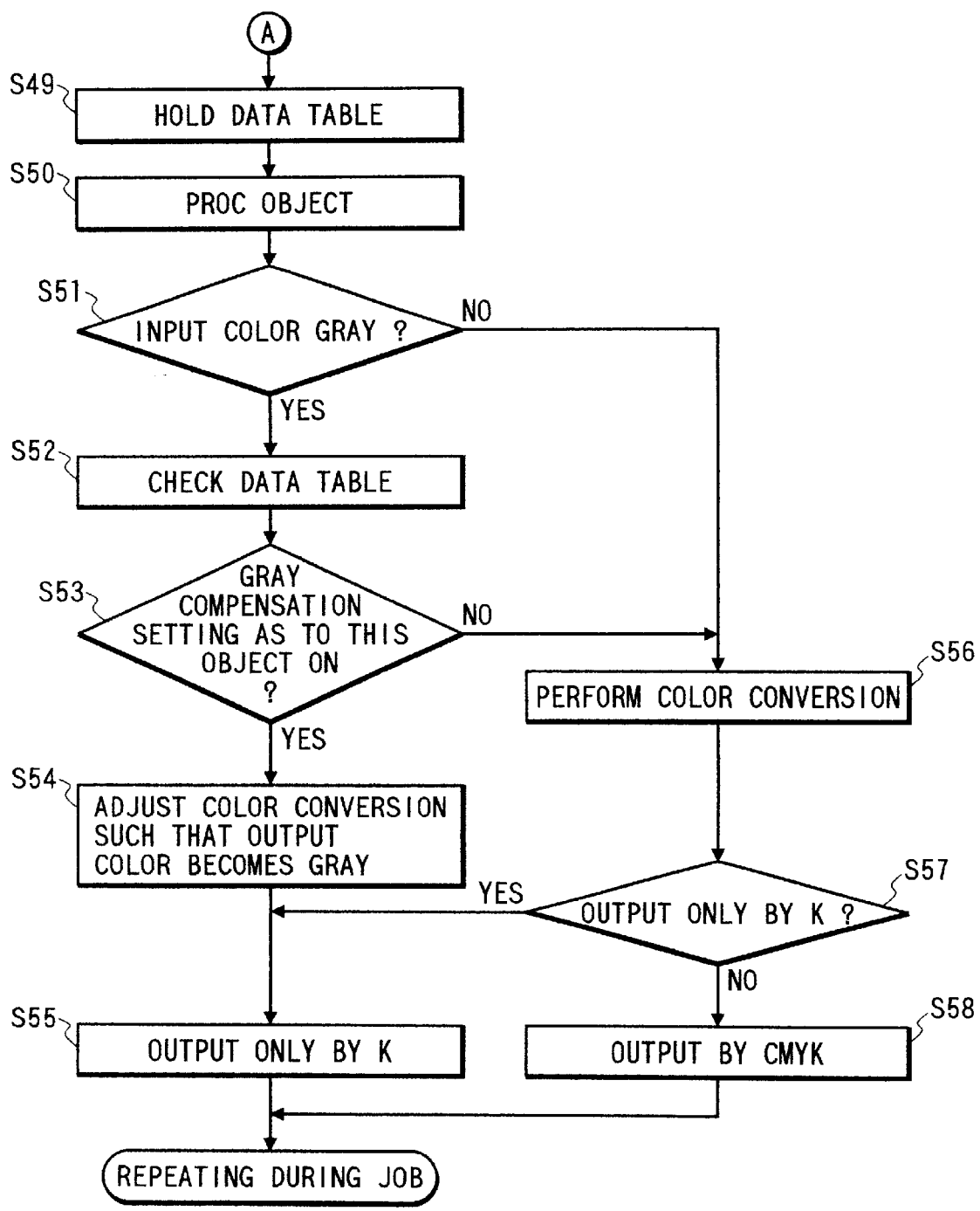
FIG. 6 which is composed of FIGS. 6A and 6B is a flowchart showing a processing procedure of the printer in the image output system according to the embodiment.

A control program to execute color processes which are performed in the printer as shown in flowcharts of FIGS. 6A and 6B that are executed by the CPU 12 has been stored in the program ROM 1302 in the ROM 13. Font data or the like which is used when it is outputted to the printer engine 17 has been stored in the font ROM 1301. In case of a printer without the external memory 14 such as a hard disk or the like, information or the like that is used on the host computer has been stored in the data ROM 1303.

A control program to execute processes shown in flowcharts, which will be explained hereinlater, can be also stored in the ROM 13. In this case, the control programs are transferred to the host computer 3000 as necessary.

The CPU 12 can perform a two-way communication with the host computer 3000 through an input unit (HSTC) 18 and can notify the host computer 3000 of information of the printer 1500. Reference numeral 19 denotes the RAM which functions as a main memory, a work area, or the like of the CPU 12. The RAM 19 is constructed so that a memory capacity can be expanded by an option RAM which is connected to an expansion port (not shown). The RAM 19 is used as an output information developing area, an environmental data storing area, an NVRAM, or the like. In a manner similar to the case of the host computer 3000 mentioned above, the control program to be executed by the CPU 12 can be also down-loaded from the external memory 14 into the RAM 19.

An access to the external memory 14 such as hard disk (HD), CD-ROM, IC card, or the like is controlled by a disk controller (DKC) 20. The external memory 14 as an option stores font data, emulation program, form data, and the like. Reference numeral 1501 denotes the foregoing console unit and switches for operation, LED display, and the like are arranged on the console unit.

The foregoing external memory 14 is not limited to one memory but the system can be also constructed in a rule such that at least one or more memories are provided and a plurality of external memories in which an option font card and a program to interpret printer control languages of different language systems in addition to the built-in fonts stored in the font ROM 1301 have been stored can be connected. Further, it is also possible to construct such that the system has an NVRAM (not shown) and printer mode setting information inputted from the console unit 1501 is stored.

In the image output system constructed as mentioned above, when there is a print request to a printer control program 2000 on the host computer 3000, a group of objects indicative of an image as a print target are transferred to the printer control program 2000 from an application included in the host computer 3000.

The object is constructed by a drawing command and color information.

In the image output system according to the embodiment, a color matching process based on a profile of the printer is performed on the host computer by using a color space that is independent on the device. An output color process for converting into CMYK data according to characteristics of the printer is executed on the printer.

The printer control program needs to convert the color information of the object into color information of the printer 1500. The printer control program inputs the information of the object and constructs the color information of the printer 1500. The constructed color information is transferred to the printer through the interface 21 and becomes input color information in the printer. An output color process is executed for the input color information and an image is printed on a recording medium. In the color printer, for example, toners of CMYK are used as recording materials which are transferred onto the recording paper when obtaining a print result.

When the toners of three colors of CMY are mixed, gray can be reconstructed. Therefore, in a color printer using the toners of CMYK as recording materials, in order to reconstruct gray, a case of reconstructing gray by using the toners of four colors of CMYK and a case of reconstructing gray by using only the K toner are considered.

In case of using the toners of four colors of CMYK to reconstruct gray, there is a possibility such that a color is deviated from gray by the output color process in spite of a fact that the input color to the printer is gray.

That is, for example, in case of printing a character of gray color, when gray is slightly deviated in the output color process, micro amounts of materials of CMY enter the character, so that a character of a pale color is reconstructed.

On the other hand, in case of using only the toner of K color in order to reconstruct gray, in a printing of a color image having continuous gradations, if an image is reconstructed by only the toner of K color for the input gray signal in the output color process, since there is a limitation of gradations as compared with the gradations which can be reconstructed by using the toners of CMYK. Therefore, a discontinuous point likely to occur in the output color processing result and there is a possibility such that a gradation reconstructing performance deteriorates.

In the image output system, therefore, it is sufficient that it is possible to properly control the switching of a mode (gray compensation mode) in which it is compensated by an output color process that an output is a gray signal for an input gray signal and an image is printed by only the recording material of K and a mode in which an image is printed by the recording materials of CMYK. Further, in order to control the mode, it is sufficient that whether an object is an object in which continuity is not requested in an output image or not can be notified to the printer side.

When the control information of the printer is constructed, when there is gray compensation process information in the RAM or ROM/external memory, although such information can be used, the printer control program executes a process to transmit and receive the gray compensation process information to the printer 1500 through the bidirectional interface 21. The PRTC 8 generates a request to the printer 1500 so as to transfer a group of control information that is necessary for a color converting process (including gray compensation). On the printer 1500 side, the information obtained from the construction and the ROM/external memory/RAM is processed and transferred as a control information group for processing from the HSTC 18 to the host computer. The processing control information group to be transferred includes features and abilities among the selection results necessary for selection of control means, selecting conditions, and the like. It is not always necessary to use all of the processing control information group but it is also possible to extract control information for processing as necessary and to use it for construction of the control information of the printer. Timings for transmitting and receiving the processing information are not particularly limited.

There is a print request to a driver (printer control program) on the host computer 3000 and a group of objects as printing targets are inputted to the driver. The driver enters a processing stage for converting the color information of the objects into the color information of the printer 1500. The driver transfers the color information included in the objects to a color correction routine every object. An existing location of the color correction routine can be set into any one of the inside and outside of the driver.

At this time point, information regarding gray compensation exists at a position where it can be referred from the driver/color correction routine.

When the information cannot be referred from the color correction routine, the information about the gray compensation can be also transferred to the color correction routine simultaneously with the color information.

The color correction routine performs a color correcting process according to the attributes of the object and a gray compensation setting state.

A format of a color to be returned to the driver can be either dependent or independent on the printer and is decided on the basis of a constructing method of the printer color information of the driver.

The color information returned from the color correction routine is transferred together with the drawing command as object information to the printer 1500. When the color information included in the object information is converted into the output color in accordance with the kind of object, the printer 1500 refers to the setting of the present gray compensation. When the gray compensation for a specific object has been set, as an input color indicative of gray, an output color is formed as gray and an image is outputted by only K. Even when the gray compensation for the specific object has been set, if the input color is not gray and when the gray compensation is not set, the color converting process for color converting into the CMYK data is executed and an image is outputted by four colors of CMYK.

When using a flow of such processes, in case of compensating gray of the object to which there is a print request on the host computer 3000, the information can be transmitted up to the output result by the printer 1500.

Figure 3:
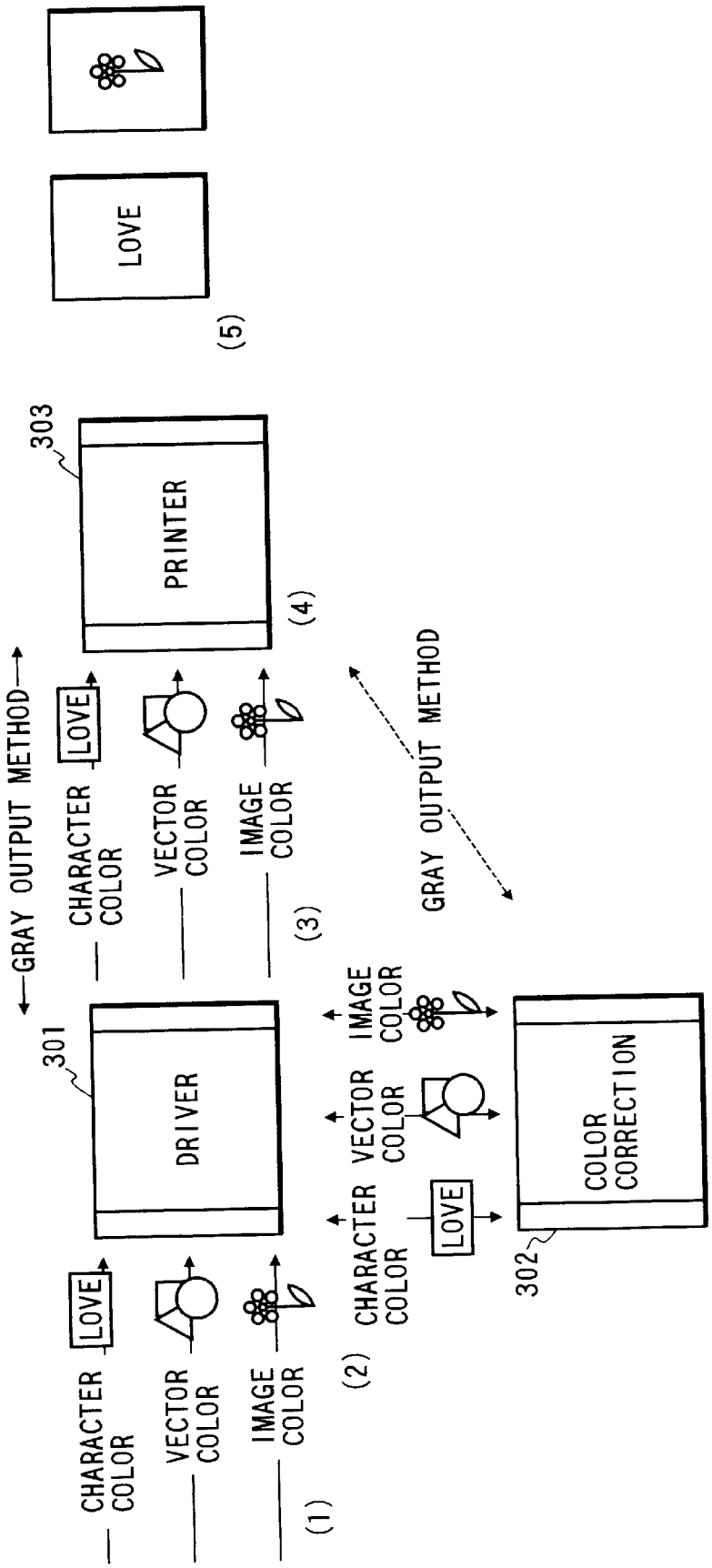
FIG. 3 is a conceptual diagram showing an outline of processes in the image output system according to the embodiment.

FIG. 3 shows an outline of the above processes.

When there is a print request to a driver 301 on the host computer, the object group indicative of an image as a printing target are transferred to the driver 301.

At the front stage, the driver 301 inquires a printer 303, obtains information regarding the gray compensation, and sets with respect to the gray compensation. If the driver 301 doesn't inquire, the driver 301 forms similar information.

The driver 301 enters a stage of performing the color matching process to the color information included in the object information. The driver 301 transfers the color information to a color correction routine 302 on the host computer every object. The color correction routine 302 executes the color matching process according to the attributes of the object and a gray compensating state and returns the result to the driver 301. The printer 303 performs an output color conversion in accordance with the attributes of the object and the gray compensating state and forms CMYK data according to the characteristics of the printer. As mentioned above, by interlocking the color matching process and output color process with the gray compensating state, an output image of a high quality can be obtained.

In the color matching process, a process for absorbing a difference between a color reproducing range of an image as a printing target and a color reproducing range of the printer is executed. On the other hand, in the output color process, processes according to output characteristics of the printer such as luminance density converting process, masking process, undercolor removing process, gamma correcting process, and the like are executed, thereby forming CMYK data corresponding to the kinds of recording materials which are used in the printer.

The gray compensating process according to the attributes of the object will now be specifically explained hereinlater.

First, a set control method for the printer of the gray compensation in the above outline will be described with reference to FIG. 4.

Examples of processes to be set are shown at 400, 410, and 420.

The process 400 intends to set the gray compensation by a panel of the printer. The process 410 intends to set the gray compensation by an application. The process 420 intends to set the gray compensation by the driver.

By such processes, a state about the gray compensation can be set by using methods 401, 402, and 403.

In the method 401, ON/OFF of each object is set. ON/OFF is designated in an object unit. A using method of changing one object from a specific state in which ON/OFF can be also designated for one object or a plurality of objects is effective.

In the method 402, a unique ID is allocated to each combination in which ON/OFF has been set every object to be selected from a representative combination. The ID is used upon designation. The whole setting can be updated by one ID.

In the method 403, ON/OFF is set with a parameter upon color designation. When the object color is designated, ON/OFF is also simultaneously set with an additional parameter. When the object color is designated, when the operator wants to simultaneously switch the gray compensation, such a method is compact rather than issuing another switching command.

By selectively using those settings in accordance with a processing situation, the switching can be performed without an overhead. The information of the printer is updated every switching and can be also referred from the host computer. The printer refers to a set table of every object formed as mentioned above and switches and outputs the output color processing method every print object.

As mentioned above, according to the embodiment, the user can arbitrarily set whether the gray compensation is performed or not to each of the objects having the different attributes (character, vector, image, etc.) included in the same image.

Processes in the case where only the character object has been set to ON with respect to the gray compensation will now be specifically explained with reference to FIG. 3.

A fact that the gray compensation about the character object is ON is set into the color correction routine 302 and printer 303.

(1) On the basis of the print request to the driver 301 on the host computer, the character object is transferred. The driver 301 enters a stage of constructing the color conversion for the color information of the character object.

(2) The driver 301 transfers the color of the character object to which there is the print request to the color correction routine 302. The color correction routine 302 executes the color matching process according to the ON state of the gray compensation for the character object color and returns the result to the driver 301. When the input color is gray because the gray compensation for the character object is ON, the color correction routine performs the color matching process in which a fact that the color matching processed output color is gray was compensated.

The above processes (1) and (2) are executed for the object having different attributes such as character object, vector object, image object, and the like included in the same image on the basis of the mode regarding the gray compensation that was set.

Since the gray compensation has been set to OFF in the vector object and image object, in the process (2), the color matching process in which importance is made to a color appearance and color gradation is executed to the vector object and image object instead of the color matching process to reconstruct gray at a high fidelity.

(3) The color information of each object returned from the color correction routine 302 is transferred to the printer 303 as object information together with the corresponding drawing command.

(4) The printer 303 color converts the input color into the output color shown by the CMYK data according to the printer characteristics in accordance with the attributes of the object and the setting state of the gray compensation, executes a developing process on the basis of the output color and the drawing command, synthesizes a plurality of objects according to the transferred same output image, and forms raster image data indicative of the output image.

Since the gray compensation has been set to ON for the character object, when the input color is gray, the data is converted into only K data in order to reconstruct the output color as gray. That is, the C, M, and Y data are converted into 0. The data is converted into the CMYK data for colors other than gray.

On the other hand, since the gray compensation has been set to OFF for the color information in the vector object and image object, the data is converted into the CMYK data.

(5) As mentioned above, since the color process suitable for each object is performed while interlocking the color matching process on the host computer with the color conversion on the printer, the color reconstruction of the gray portion of the character object included in the image on the host computer to which there is a print request can be compensated. Further it is possible to reconstruct by making importance to a color appearance and continuity of color for objects other than the character object.

FIGS. 5A, 5B, 5C, 6A, 6B, 7A and 7B show flowcharts for a processing flow of the processes in FIG. 3.

Figures 5, 5A:
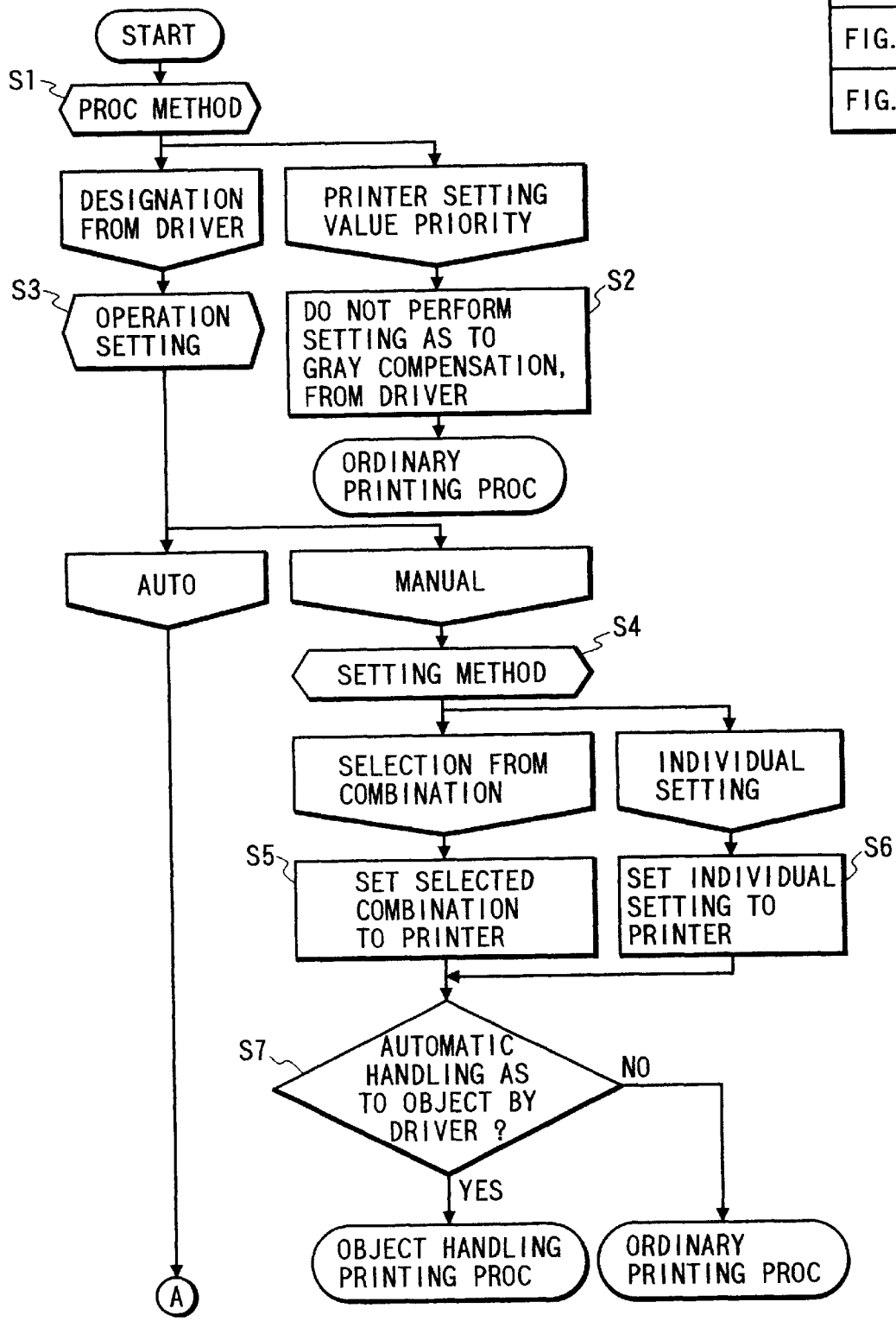
FIG. 5 which is composed of FIGS. 5A, 5B and 5C is a flowchart showing a processing procedure of a driver in the image output system according to the embodiment.
Figure 5B:
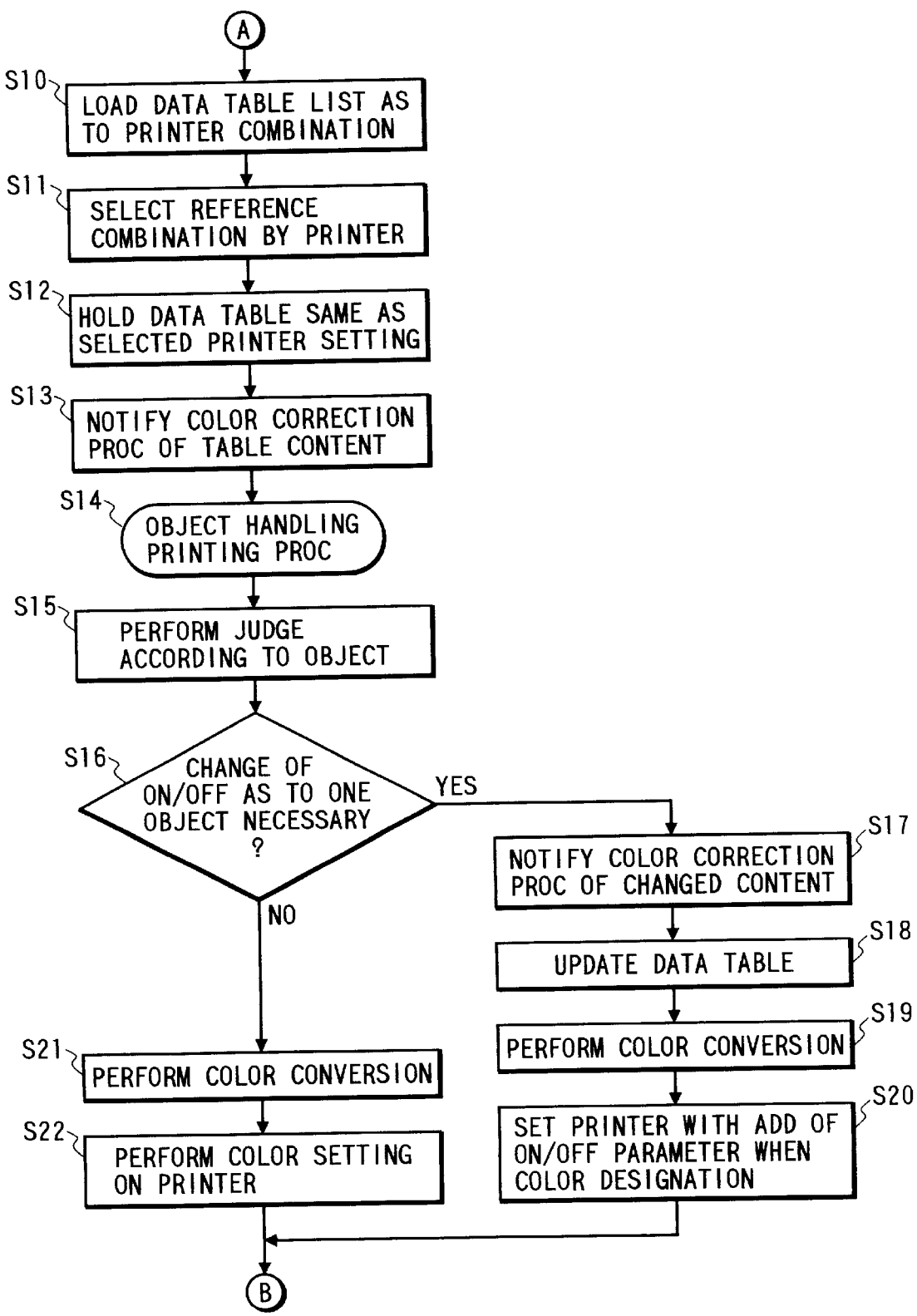
Figure 5C:
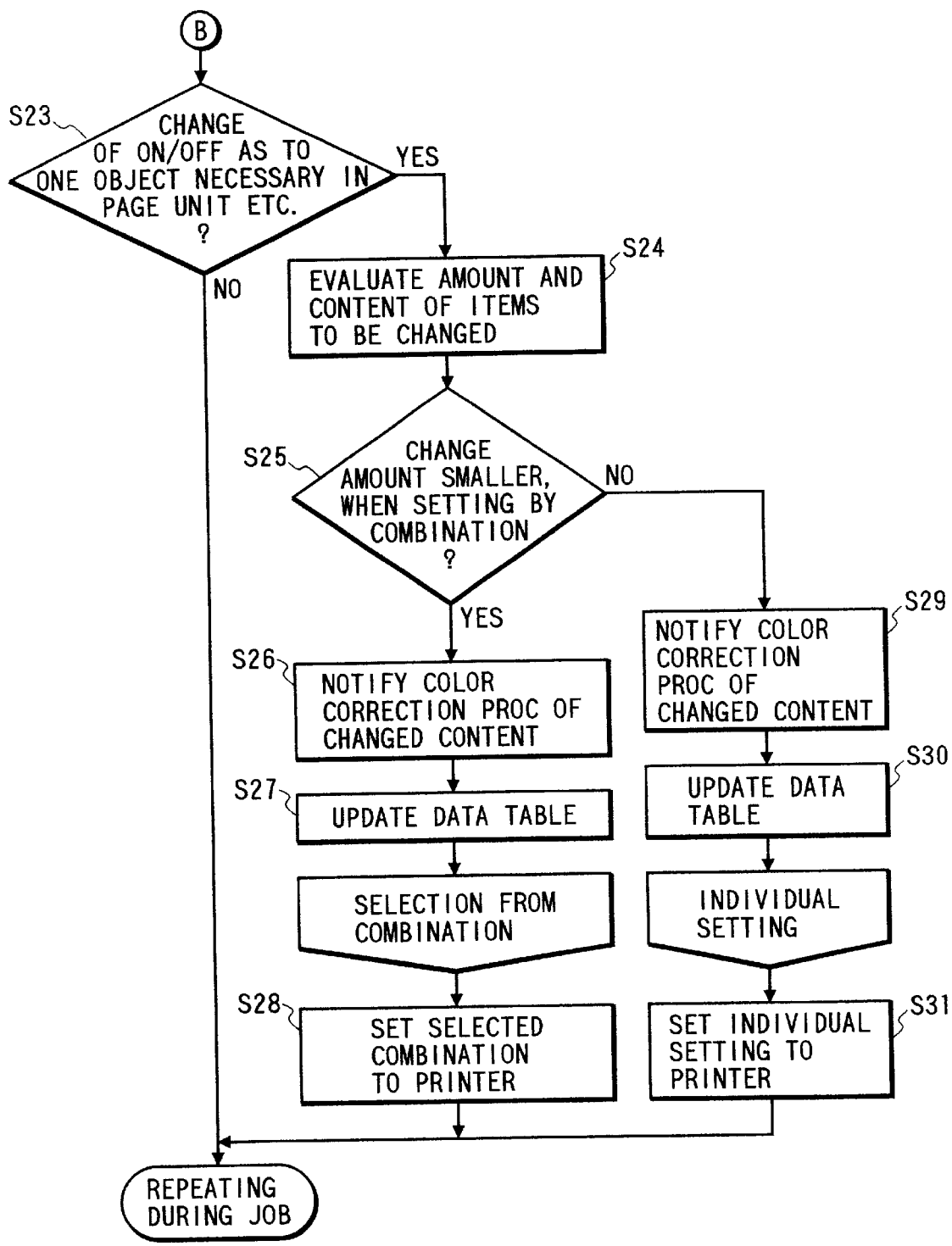
Figure 7B:
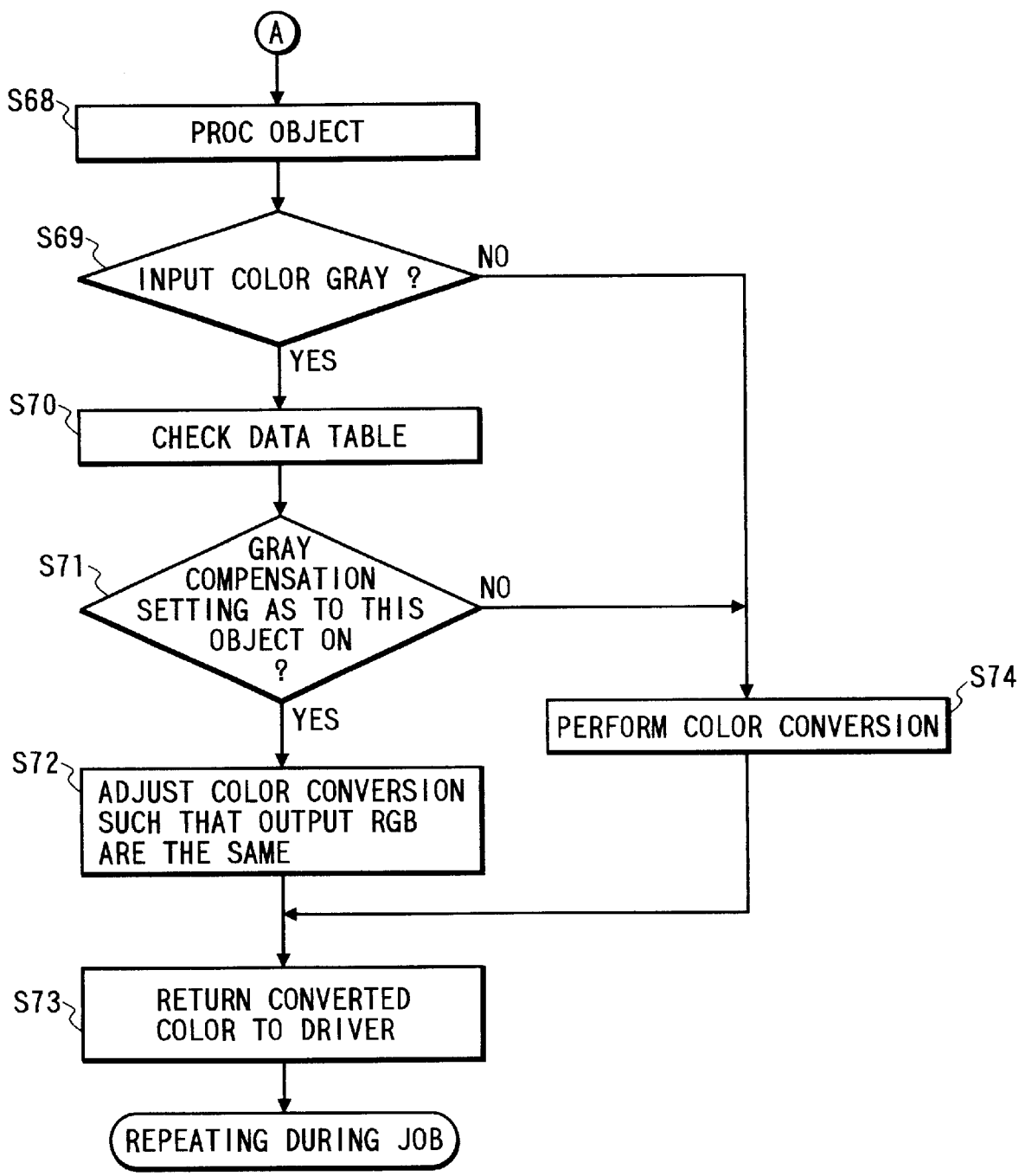
FIG. 7 which is composed of FIGS. 7A and 7B is a flowchart showing a processing procedure for a color correction routine in an image processing system according to the embodiment.

FIGS. 5A to 5C show the flows of processes of the driver. FIGS. 6A and 6B show the flows of processes in the printer. FIGS. 7A and 7B show the flows of processes of the color correction routine.

First, the flow of processes of the driver is shown with reference to FIGS. 5A to 5C. In step S1, a processing destination (processing method) is discriminated. If the user set a method of preferentially using the set values of the printer for the driver, step S2 follows. The setting regarding gray compensation is not particularly performed from the driver but an ordinary printing process is executed (the driver doesn't form any control code of the gray compensation).

When the user set the setting method from the driver, the operation setting is confirmed in step S3. Namely, in case of using a default value in which the gray compensation mode has been preset, "auto" is selected. In case of manually setting the gray compensation mode as shown in FIG. 4, "manual" is selected.

When "manual" is set, the setting method is confirmed in step S4. In case of selecting a desired combination from combinations as shown at 411 in FIG. 4, a combination indicative of a desired gray compensation mode is selected from among preset combinations. The gray compensation mode selected is set into the color correction routine and the printer in step S5.

Figure 4:
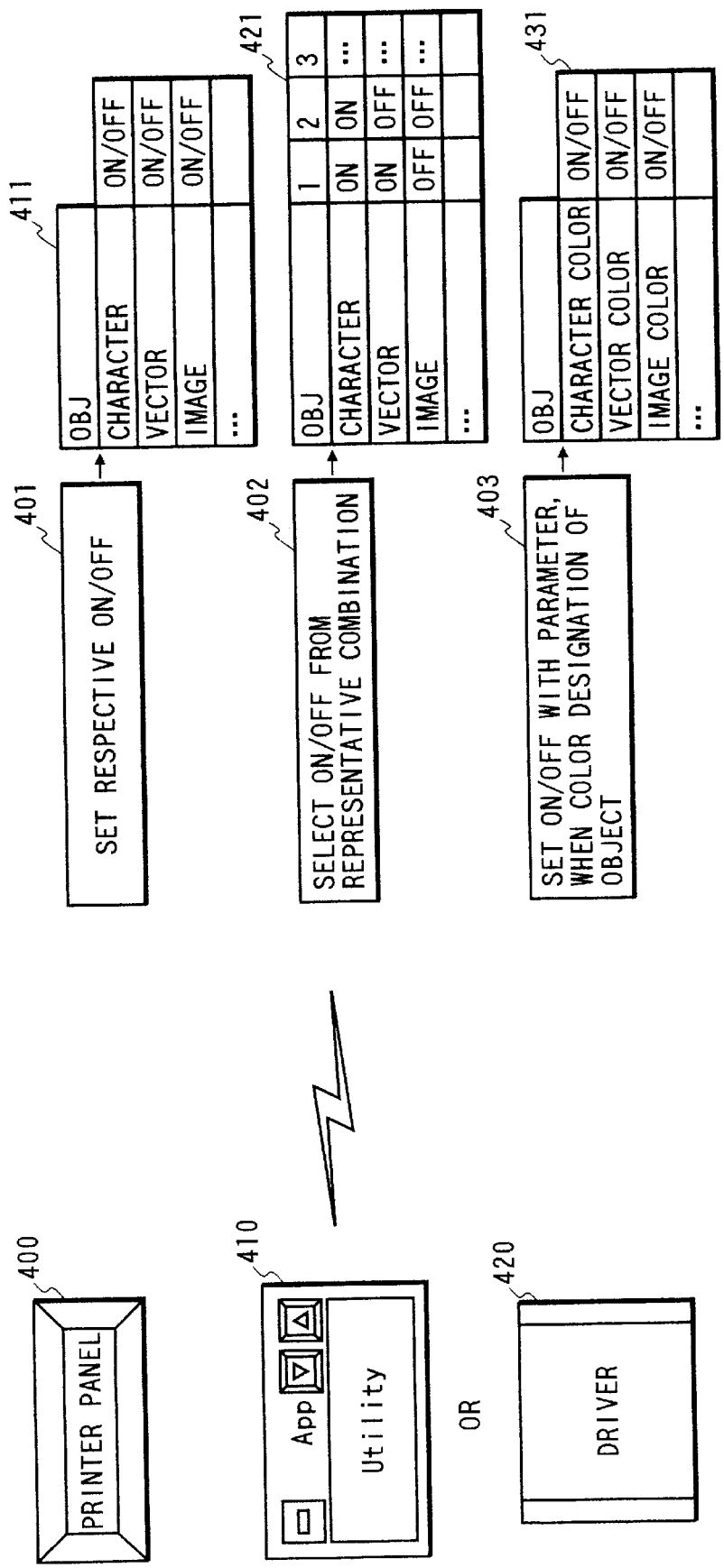
FIG. 4 is a conceptual diagram showing an outline of processes in the image output system according to the embodiment.

As shown at 401 in FIG. 4, the user individually arbitrarily set ON/OFF of the gray compensation for every object. In step S6, the gray compensation mode which was individually set every object is set into the color correction routine and the printer.

If the auto handling of the driver for the object has been designated in step S7, an object handling printing process is executed. If not, the ordinary printing process is performed.

On the other hand, when the operation setting has been set to "auto", a combination data table of the printer is loaded in step S10. A reference combination of the subsequent processes is selected in step S11. The same data table as the setting selected in the printer is held in step S12. At the same time, the table contents are also notified to the color correction routine in step S13.

A preparation to enter the object handling printing process from step S14 is now completed up to step S13. When an actual print object is transferred from the system to the driver, the driver discriminates the attribute (kind) of object on the basis of a drawing command included in the object in step S15 and starts the process according to the object. A check is made in step S16 to see if it is necessary to change ON/OFF of the gray compensation regarding the transferred object. If YES, the changed content is notified to the color correction routine in step S17. The data table is updated in step S18. The color matching process is executed by the color correction routine in step S19. An object to be outputted to the printer including the parameter of the gray compensation is formed in step S20.

When there is no need to change in step S16, the color matching process is executed in step S21 in a manner similar to step S19. An object to be outputted to the printer is formed in step S20.

In step S23, when it is necessary to change the gray compensation mode regarding the object on a larger unit basis such as page unit or the like, an amount and content of the item to be changed are first evaluated in step S24. If the change amount when setting by the combination is smaller as an evaluation result here (step S25), the changed content is notified to the color correction routine in step S26. At the same time, the data table is updated in step S27. The selected combination is set into the printer in step S28. On the contrary, when the change amount when setting by the combination is larger (step S25), the changed content is notified to the color correction routine in step S29. At the same time, the data table is updated in step S30. ON/OFF that is peculiar to each object indicative of the changed gray compensation mode is set into the printer in step S31.

Since the setting of the gray compensation mode can be changed on a page unit basis, a finer process can be executed.

FIGS. 6A and 6B show the flowcharts for the processes of the printer.

First in step S41, the apparatus is initialized in a panel-setting state of the gray compensation. As shown in step S42, when the resetting is performed by the panel, a reinitialization is performed. When the setting is changed from the driver (step S43), the setting method is discriminated in step S44. In case of the combination selection, a combination data list is loaded in step S45. An entry corresponding to the selected combination is searched in step S46. In case of the individual setting or the selection with the parameter, if the setting is different from the present one (step S47), the setting is changed in step S48. The changed data table is held in step S49. An output color process according to the characteristics of the printer is executed for the color information of the object on the basis of the gray compensation set by the data table in step S50. When the color information indicates gray color (in case of RGB, all of the colors are equal) in the output color process (step S51), the data table is examined in step S52. When the gray compensation with respect to the object is set to ON (step S53), the output color conversion so as to set the output color to gray (CMY=0) is carried out in step S54. An image is reconstructed by only K in step S55. When the gray compensation regarding the object has been set to OFF (step S53), the output color process is performed in step S56. When the output color indicates gray as a result of the output color process (step S57), an image is reconstructed by only K in step S55. When the output color as a result of the output color process doesn't indicate gray (step S57), the image is reconstructed by using the color recording material in step S58. By performing the above processes with respect to all of the objects, an output image is formed.

FIGS. 7A and 7B show the flowcharts for the processes of the color correction routine.

In step S61, the data table of the driver is referred. An initializing process is performed in step S62. The data table is held as shown in step S63. When the change of setting is notified from the driver (step S64), the setting method is discriminated in step S65. The data table of the driver is referred to in step S66. The data table is held as shown in step S67. The color matching process is executed to the color information of the object in step S68. In this instance, when the input color is a gray (for example, in case of RGB, all of them are equal) color (step S69), the data table is examined in step S70. If the gray compensation with respect to this object has been set to ON (step S53), the color matching process such as to set the output color to gray is performed in step S72. The color after completion of the color matching is returned to the driver in step S73. If the gray compensation with respect to the object has been set to OFF (step S53), the color matching process in which importance is made to the color appearance and color continuity is executed in step S74. The color information after the color matching is returned to the driver in step S73.

According to the embodiment as described above, output color processing means for a plurality of input gray color signals corresponding to the kinds of objects can be set.

The output color processing means for a plurality of input gray color signals can be automatically switched by the objects.

The gray processing method for the input gray in the single color output process can be controlled without switching the color processing means itself.

The occurrence of a color deviation in a portion where the user expects the output in gray can be prevented.

A fine control without an overhead of the output color processing method for the input gray color signal can be performed.

[Modifications]

In the embodiment, when the printer 1500 and host computer 3000 can perform a two-way communication through a cable, the data stored in the ROM or the like and the present state can be referred to with each other. The bidirectional interface can be applied to the embodiment irrespective of the kind of wire/radio interface.

The discrimination about whether the input color is gray or not is not always limited to the condition such that the values of a plurality of color components coincide as in the embodiment but it can be also discriminated with a slight allowance. That is, when the input color is almost gray, the gray compensating process can be also performed. In the embodiment, since the gray compensating process can be set every object, a point that the gray compensating process is set to ON denotes that the user makes importance to the gray portion than the other colors. Therefore, by making importance to gray by making a discrimination with a slight allowance, there is a possibility such that an image suitable for a desire of the user can be provided.

It is also possible to construct in a rule such that the processes of the flowcharts shown in FIGS. 5A, 5B, 5C, 6A, 6B, 7A and 7B are executed by using a hardware circuit such as an arithmetic operating circuit or the like.

Figure 8:
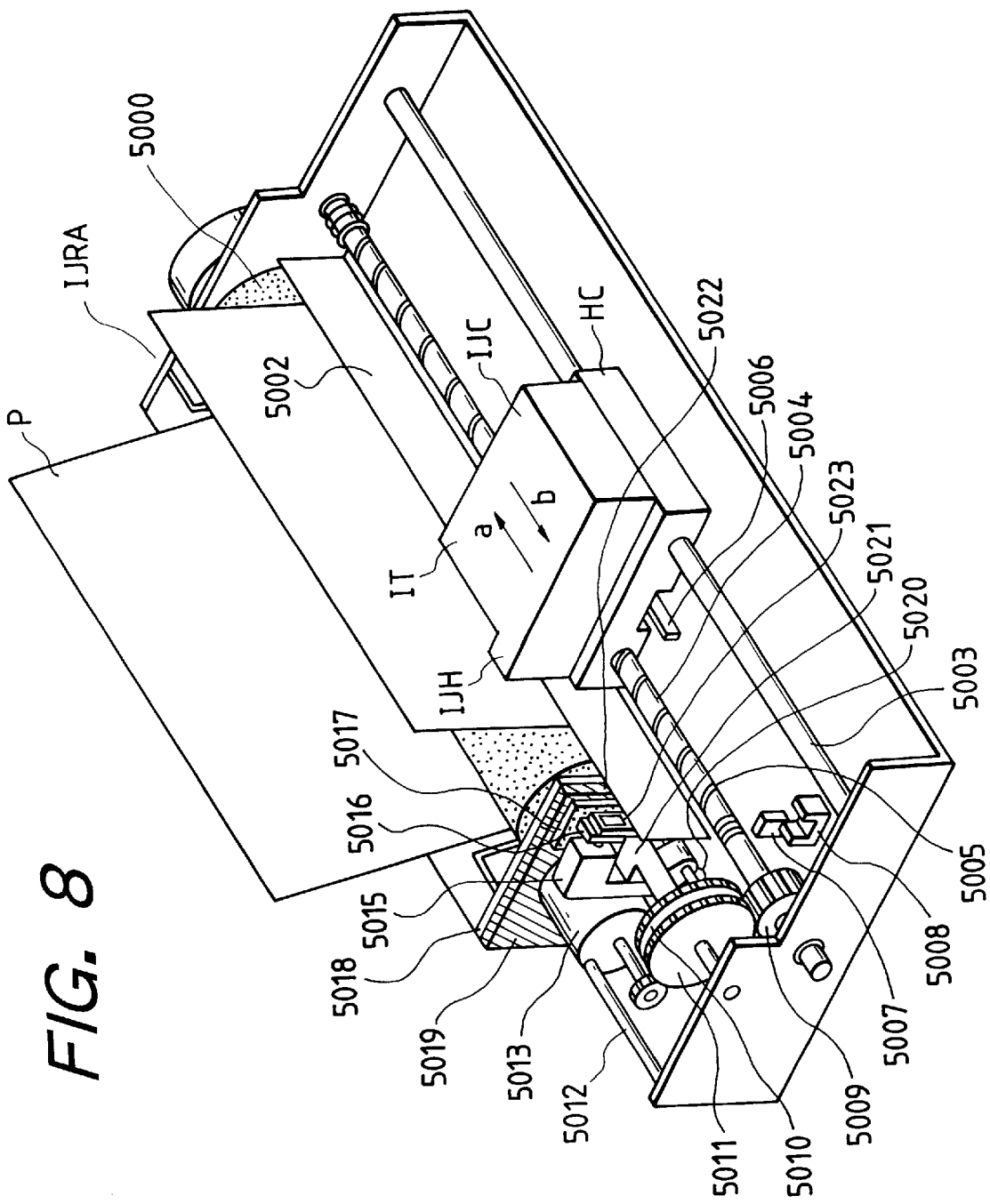
FIG. 8 is a schematic perspective view showing a structure of a recording unit of an ink jet printer showing an example of an output apparatus according to the embodiment.

FIG. 8 shows a structure of an ink jet recording apparatus (IJRA) as another embodiment of the printer which can be applied to the invention.

In the diagram, a carriage HC which is come into engagement with a spiral groove 5004 of a lead screw 5005 which rotates through driving force transfer gears 5011 and 5009 in an interlocking relation with a forward/reverse rotation of a driving motor 5013 has a pin (not shown) and is reciprocatingly moved in the directions shown by arrows (a) and (b). An ink jet cartridge IJC is mounted in the carriage HC. Reference numeral 5002 denotes a paper pressing plate for pressing a paper toward a platen 5000 in the moving direction of the carriage. Reference numerals 5007 and 5008 indicate photocouplers functioning as home position detecting means for confirming the existing of a lever 5006 of the carriage in a region where the photocouplers are arranged and executing a switching of the rotating direction of the motor 5013 or the like. Reference numeral 5016 denotes a member to support a cap member 5022 to cap the whole surface of a recording head; and 5015 indicates sucking means for sucking the inside of the cap. The sucking means 5015 performs sucking and recovery of the recording head through an opening 5023 in the cap. Reference numeral 5017 denotes a cleaning blade which is movable in the front/rear direction by a member 5019; 5018 denotes a main body supporting plate for supporting the cleaning blade 5017 and member 5019; and 5012 a lever to start the sucking of the sucking recovery. The lever is moved in association with the movement of a cam 5020 adapted to be come into engagement with the carriage. A driving force from the driving motor is transferred and controlled by well-known transfer means such as a clutch switching device or the like.

The capping, cleaning, and sucking recovery mentioned above are constructed in a rule such that when the carriage comes to a home position side region, a desired process can be performed at a corresponding position by the operation of the lead screw 5005. It is, however, sufficient to construct such that a desired operation is executed at a well-known timing.

Figure 9:
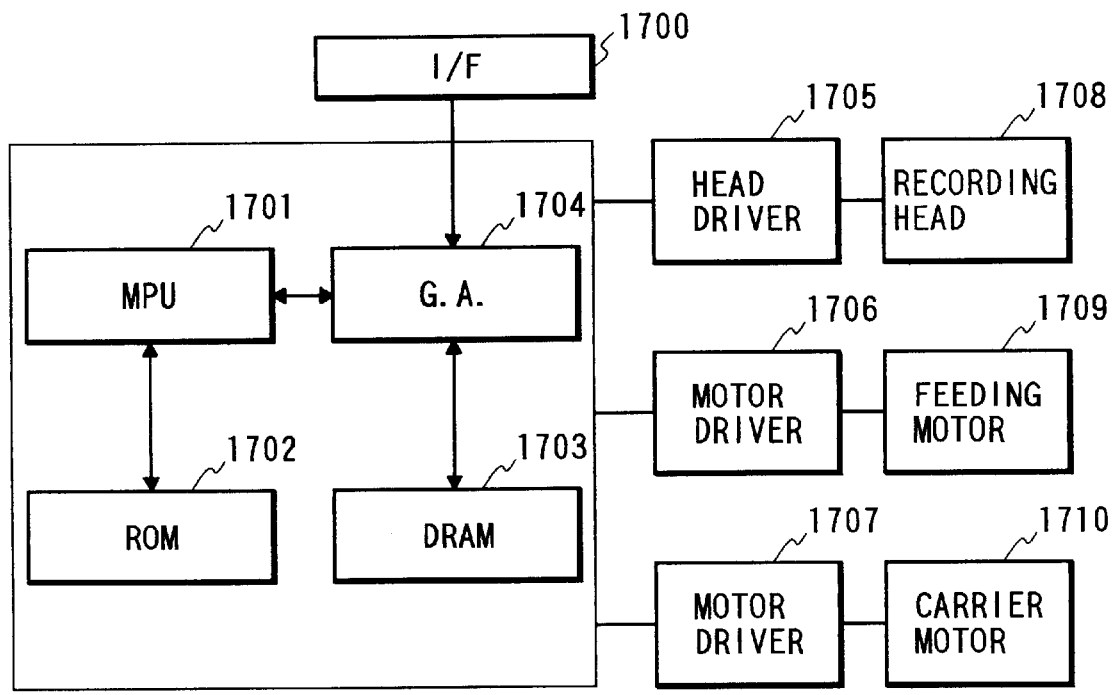
FIG. 9 is a block diagram showing a construction of the ink jet printer of the embodiment.

FIG. 9 is a block diagram for explaining a control construction of the printer shown in FIG. 8.

In the diagram, reference numeral 1700 denotes an interface for inputting a recording signal from the host computer 3000; 1701 an MPU; 1702 an ROM for storing a control program which is executed by the MPU 1701, host print information, and the like; 1703 a DRAM to store various data (the recording signal, recording data which is supplied to the head, and the like); 1704 a gate array to supply output data to a recording head 1708 and for also transferring data among the interface 1700, MPU 1701, and DRAM 1703. Reference numeral 1710 denotes a carrier motor to convey the recording head 1708; 1709 a feeding motor to convey a recording paper; 1705 a head driver to drive the recording head; 1706 a motor driver to drive the feeding motor 1709; and 1707 a motor driver to drive the carrier motor 1710.

In the recording apparatus constructed as mentioned above, when input information is inputted from the host computer 3000, which will be explained hereinlater, through the interface 1700, the input information is converted into output information for printing between the gate array 1704 and MPU 1701. The motor drivers 1706 and 1707 are driven, the recording head is driven in accordance with the output information sent to the head driver 1705, and the printing process is executed. The MPU 1701 can communicate with the host computer 3000 through the interface 1700 and can notify the host computer 3000 of memory information, resource data, and the like regarding the DRAM 1703 and the host print information in the ROM 1702.

Figure 10:
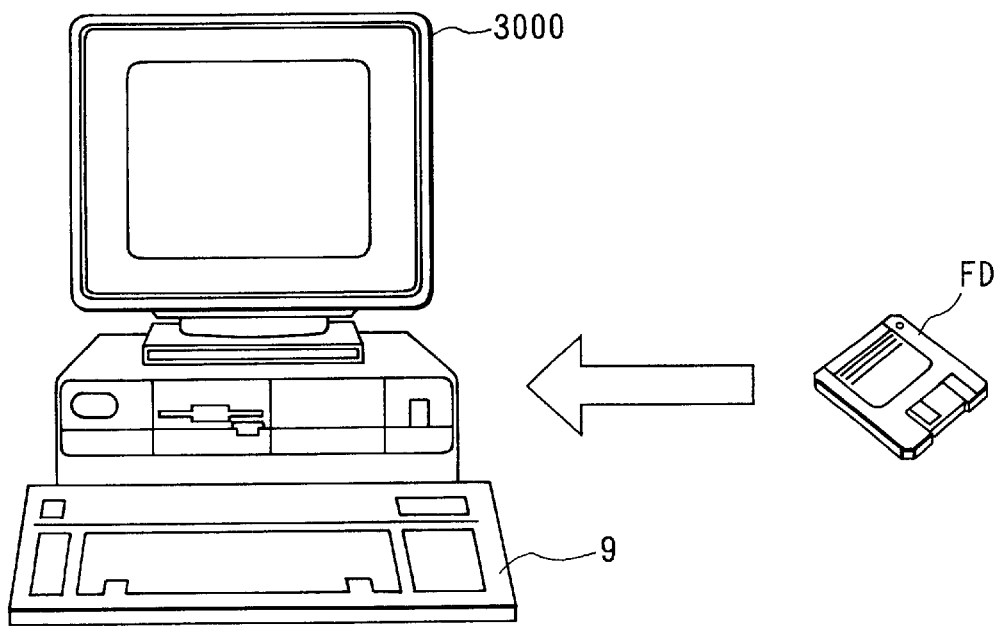
FIG. 10 is a diagram showing a state in which a control program is down-loaded into a computer 3000 according to the embodiment.

FIG. 10 is a conceptual diagram showing a state in which a floppy disk (FD: storage medium) as an external memory is located into the host computer 3000 according to the embodiment and a program stored in the disk is loaded to the host computer 3000.

Figure 11:
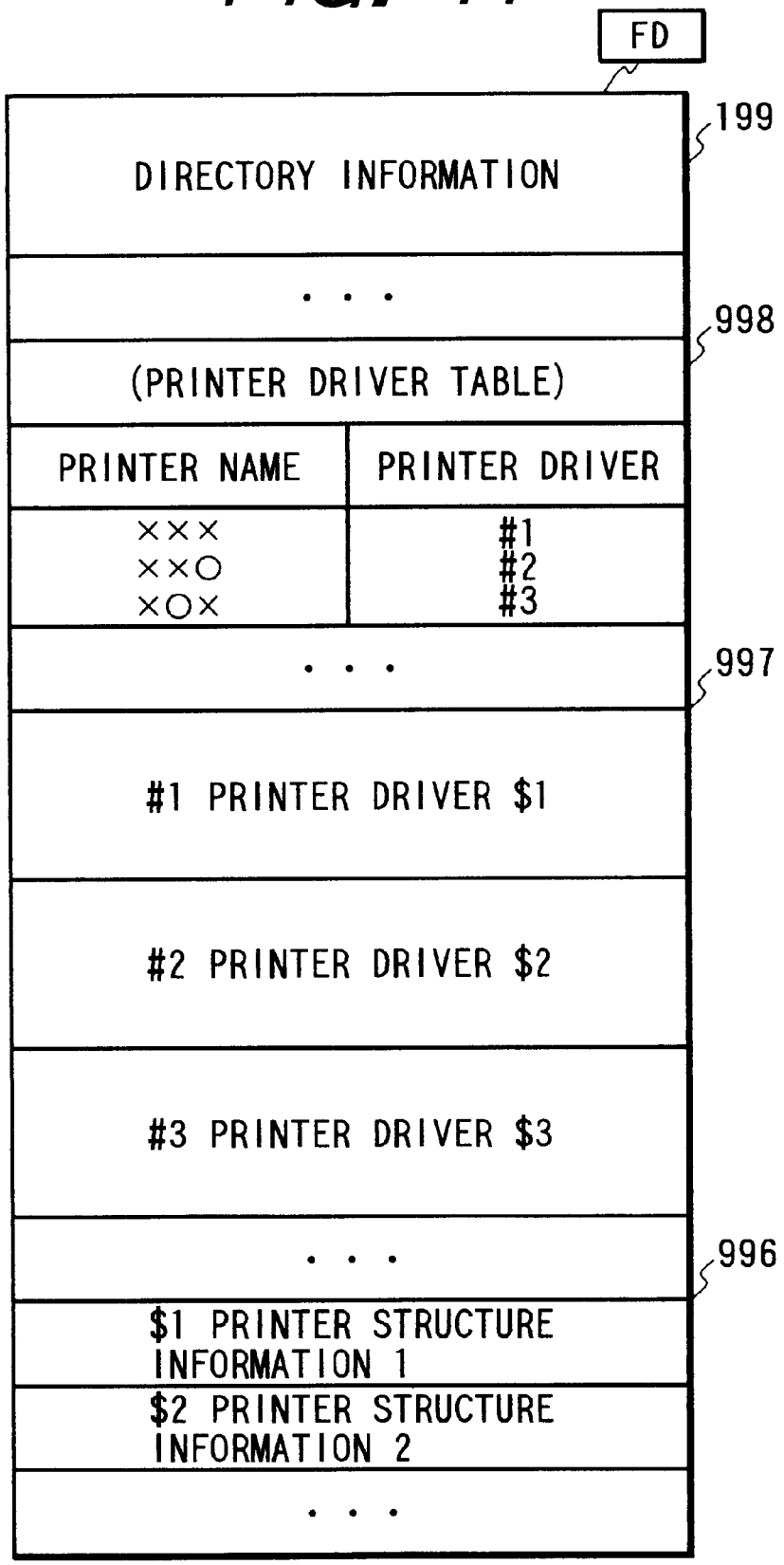
FIG. 11 is a diagram showing a memory map of a storage medium in a printer control system according to the embodiment.

FIG. 11 is a diagram showing a memory map of the FD as an example of the storage medium in FIG. 10.

Reference numeral 199 denotes an area in which directory information has been stored and indicates a storage location in a subsequent printer driver table 998. Further, in correspondence to each printer and each printer driver, for example, a storage location 997 of a program to control the printer or the like and, further, a storage location 996 such as information 1 or the like of the structure of the printer. When the operator of the host computer 3000 instructs a name of a desired printer into which he wants to install the program from the contents stored in the FD by the keyboard 9, it is loaded with reference to the printer driver table 998. For example, when a printer name "XXX" is designated, the program and structure information stored in the areas 997 and 996 can be loaded into the host computer 3000.

The invention can be also applied to a system constructed by a plurality of equipment or an apparatus comprising one equipment. The invention can be also obviously applied to a case where the invention is embodied by supplying a program to a system or an apparatus. In such a case, a storage medium in which the program according to the invention has been stored constructs the invention. By reading out the program from the storage medium to the system or apparatus, the system or apparatus operates by a predetermined method.

The object of the invention is also accomplished by a method whereby the storage medium in which a program code of software to realize the functions of the foregoing embodiment has been stored is supplied to the system or apparatus and a computer (or CPU or MPU) of the system or apparatus reads out and executes the program code stored in the storage medium. In this case, the program code itself read out from the storage medium realizes a novel function of the invention and the storage medium in which such a program code has been stored constructs the invention.

As a storage medium to supply the program code, for example, a floppy disk, a hard disk, an optical disk, a magnetooptic disk, a CD-ROM, a CD-R, a magnetic tape, a non-volatile memory card, an ROM, or the like can be used.

The invention also incorporates not only a case where by executing the program code read out by the computer, the functions of the foregoing embodiment is realized but also a case where on the basis of an instruction of the program code, the OS or the like which operates on the computer executes a part or all of the actual processes and the functions of the foregoing embodiment are realized by those processes.

Further, the invention also incorporates a case where the program code read out from the storage medium is written into a memory provided for a function expansion board inserted in the computer or a function expansion unit connected to the computer and, after that, on the basis of an instruction of the program code, a CPU or the like provided for the function expansion board or function expansion unit executes a part or all of the actual processes and the functions of the foregoing embodiment are realized by such processes.

What is claimed is:

1. An image processing method for executing, in order to form a color image with color image formation means, a color process on a color image object to generate output color image data including black component data and other color component data, the method having a mode for generating the output color image data, when one color image data representing the color image object is an achromatic color, the other component data in the output color image data are substantially zero-valued, and it is judged in the mode whether or not one color image data is the achromatic color for each pixel, the method comprising the steps of:

a setting step of setting, based on an instruction from a user, whether or not the mode is to be executed for each of a plurality of different types of color image objects;

a discriminating step of discriminating the type of input color image object; and a color processing step of executing a color process on color image data of the input color image object, wherein the color processing step controls whether or not the mode is to be executed to the color image data, on the basis of an attribute of the discriminated input color image object and the setting in the setting step.

2. A method according to claim 1, further comprising a step of executing a color matching process corresponding to the discriminated type of object image data.

3. A method according to claim 1, wherein the plurality of types of object image data include character object image data and image object image data.

4. A method according to claim 1, wherein said discriminating step discriminates the type of object image data by discriminating a drawing command of the input color image object.

5. A method according to claim 1, wherein, when one color image data representing the color image object is the achromatic color, the output color image data is generated for the color image object of the object type that the mode is not set, such that the output image is formed by a black recording material and other color recording materials.

6. An image processing apparatus for executing, in order to form a color image with color image formation means, a color process on a color image object to generate output color image data including black component data and other color component data, the method having a mode for generating the output color image data, when one color image data representing the color image object is an achromatic color, the other component data in the output color image data are substantially zero-valued, and it is judged in the mode whether or not one color image data is the achromatic color for each pixel, the apparatus comprising:

setting means for setting, based on an instruction from a user, whether or not the mode is to be executed for each of a plurality of different types of color image objects;

discriminating means for discriminating the type of input color image object; and color processing means for executing the color process on color image data of the input color image object, wherein the color processing means controls whether or not the mode is to be executed to the color image data, on the basis of an attribute of the discriminated input color image object and the setting in the setting means.

7. An apparatus according to claim 6, further comprising image forming means for forming an image on a recording medium based on the output color image data.

8. A computer-readable medium storing computer-executable process steps to execute, in order to form a color image with color image formation means, a color process on a color image object to generate output color image data including black component data and other color component data, the steps having a mode to generate the output color image data, when one color image data representing the color image object is an achromatic color, the other component data in the output color image data are substantially zero-valued, and it is judged in the mode whether or not one color image data is the achromatic color for each pixel, the steps comprising:

a setting step to set, based on an instruction from a user, whether or not the mode is to be executed for each of a plurality of different types of color image objects;

a discriminating step to discriminate the type of the input color image object; and a color processing step to execute the color process on the color image data of the input color image object, wherein the color processing step controls whether or not the mode is to be executed to the color image data, on the basis of an attribute of the discriminated input color image object and the setting in the setting step.

* * * * *

UNITED STATES PATENT AND TRADEMARK OFFICE
CERTIFICATE OF CORRECTION

PATENT NO. : 6,344,908 B1
DATED : February 5, 2002
INVENTOR(S) : Aritomi

It is certified that error appears in the above-identified patent and that said Letters Patent is hereby corrected as shown below:

Title page,
Item [56], References Cited, U.S. PATENT DOCUMENTS, "5,788,906" should read -- 5,786,906 --.

Column 1,
Line 44, "inadaptation" should read -- maladaptation --.

Column 2,
Line 7, "process" should read -- process for --; and
Line 22, "cross sectional" should read -- cross-sectional --.

Column 3,
Line 4, "cross sectional" should read -- cross-sectional --.

Column 4,
Line 1, "is" should read -- are --; and
Line 2, "has" should read -- have --.

Column 5,
Line 55, "likely" should read -- is likely --.

Column 6,
Line 28, "routine" should read -- routine for --; and
Line 67, "are" should read -- is --.

Column 7,
Lines 9, 49 and 67, "every" should read -- for every --; and
Line 44, "using" should be deleted.

Column 9,
Lines 10, 16 and 31, "set" should read -- sets --; and
Line 33, "every" should read -- for every --.

Column 11,
Line 33, "every" should read -- for every --;
Line 34, "makes" should read -- gives more --;
Line 35, "making" should read -- giving --; and
Line 46, "is" should read -- has --.

UNITED STATES PATENT AND TRADEMARK OFFICE
CERTIFICATE OF CORRECTION

PATENT NO.   : 6,344,908 B1
DATED        : February 5, 2002
INVENTOR(S)  : Aritomi It is certified that error appears in the above-identified patent and that said Letters Patent is hereby corrected as shown below:

Column 12,
Line 4, "be" should be deleted; and
Line 47, "located" should read -- loaded --.

Column 13,
Line 21, "magnetooptic" should read -- magneto-optical --; and
Line 25, "is" should read -- are --.

Signed and Sealed this

Twenty-second Day of July, 2003

JAMES E. ROGAN
*Director of the United States Patent and Trademark Office*